Feb. 17, 1953   F. M. MINNINGER ET AL   2,628,435
EDUCATIONAL DEVICE
Filed Aug. 13, 1949   3 Sheets-Sheet 1
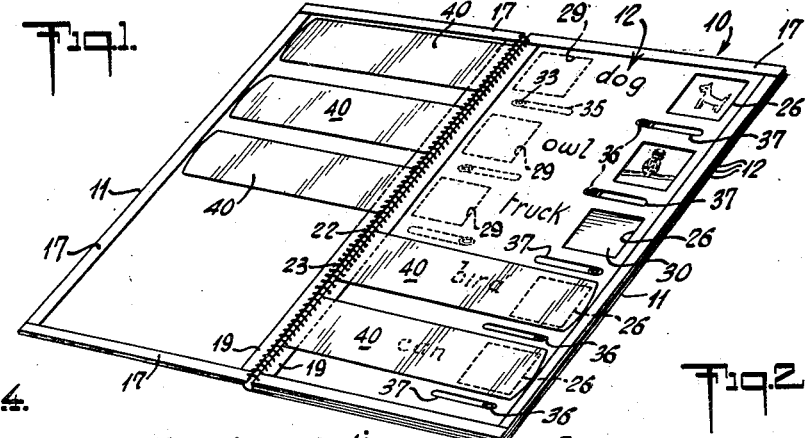
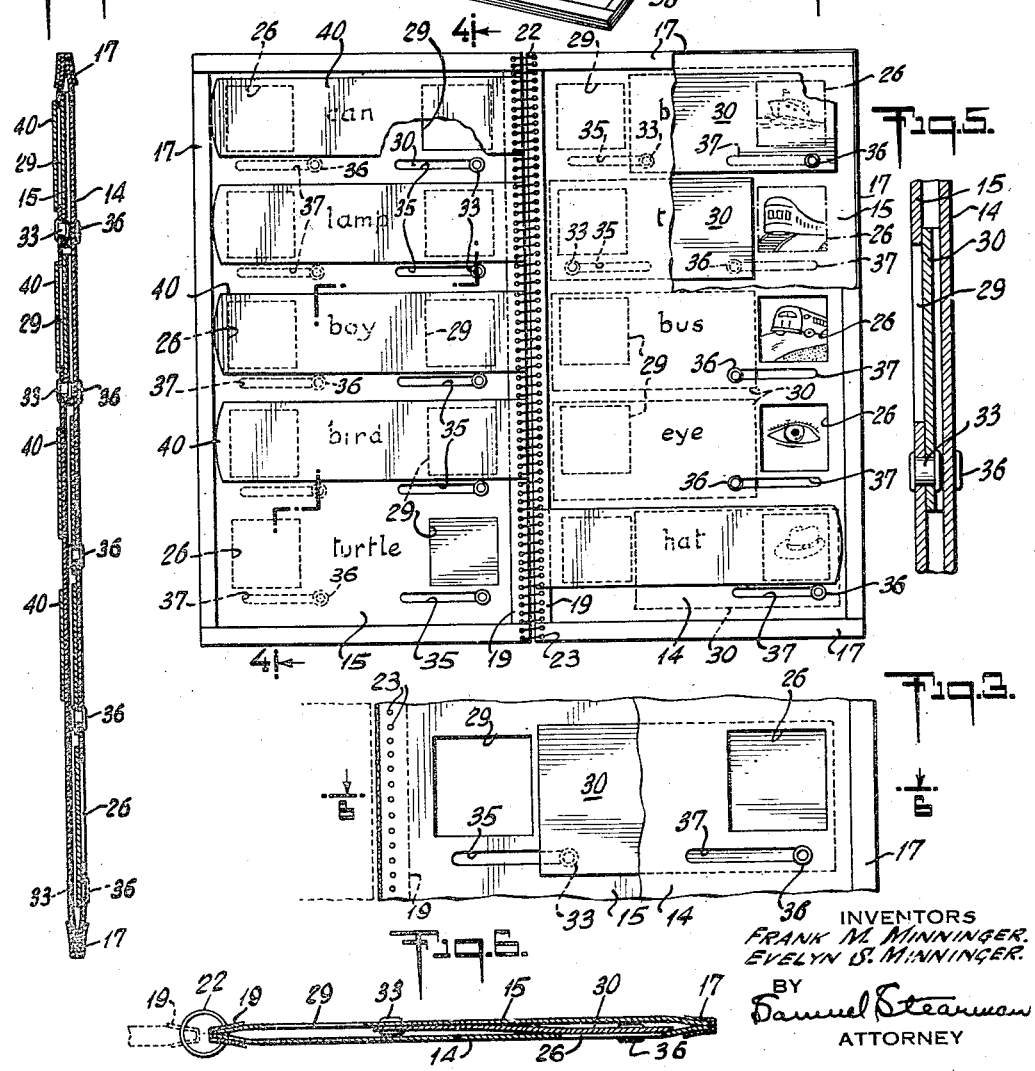
INVENTORS
FRANK M. MINNINGER.
EVELYN S. MINNINGER.
BY Samuel Stearman
ATTORNEY Feb. 17, 1953  F. M. MINNINGER ET AL  2,628,435
EDUCATIONAL DEVICE
Filed Aug. 13, 1949  3 Sheets-Sheet 2
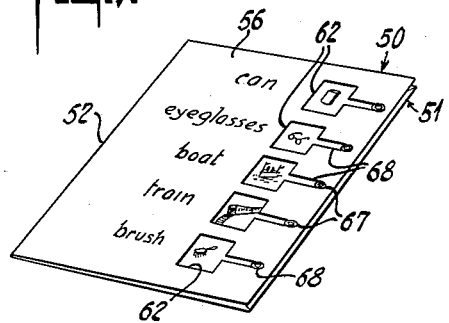
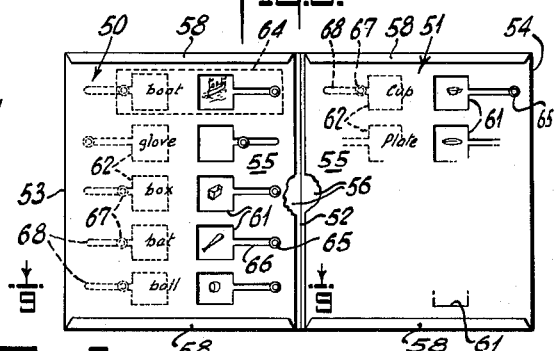
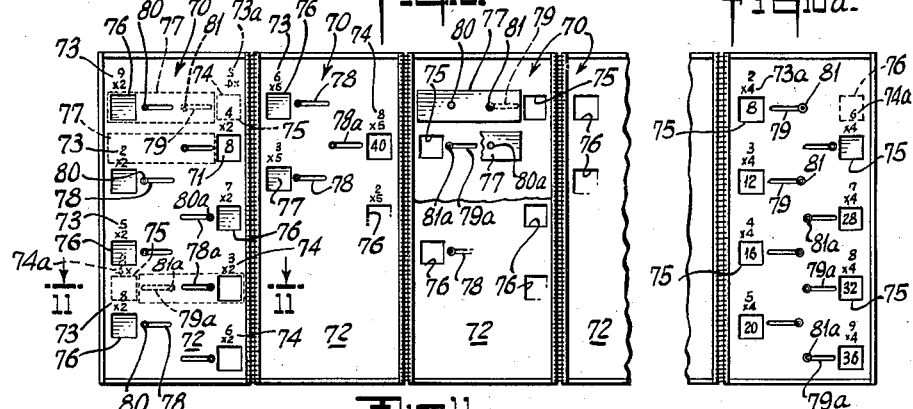
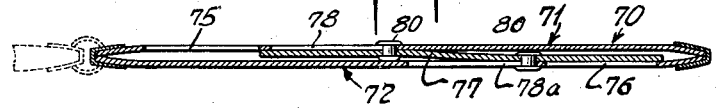
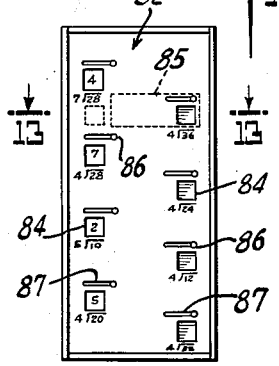
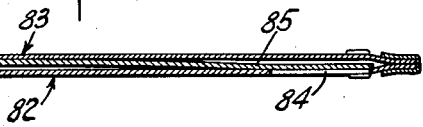
INVENTORS
FRANK M. MINNINGER.
EVELYN S. MINNINGER.
BY
Samuel Stearman
ATTORNEY Feb. 17, 1953 F. M. MINNINGER ET AL 2,628,435
EDUCATIONAL DEVICE
Filed Aug. 13, 1949 3 Sheets-Sheet 3
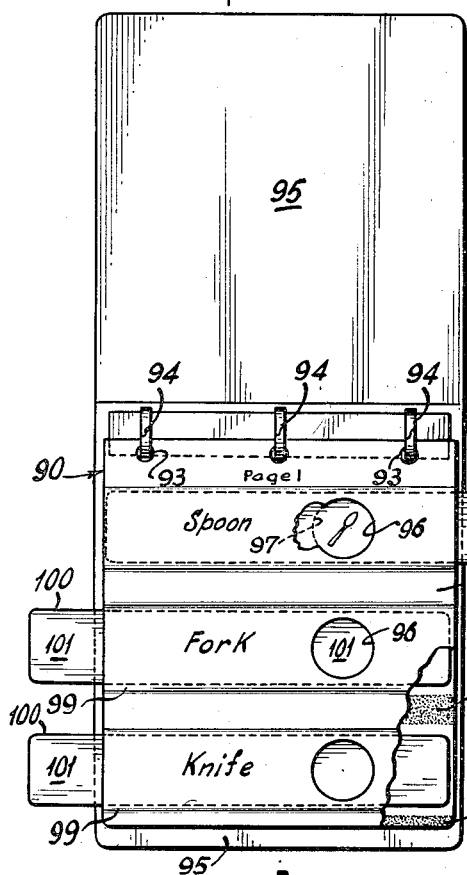
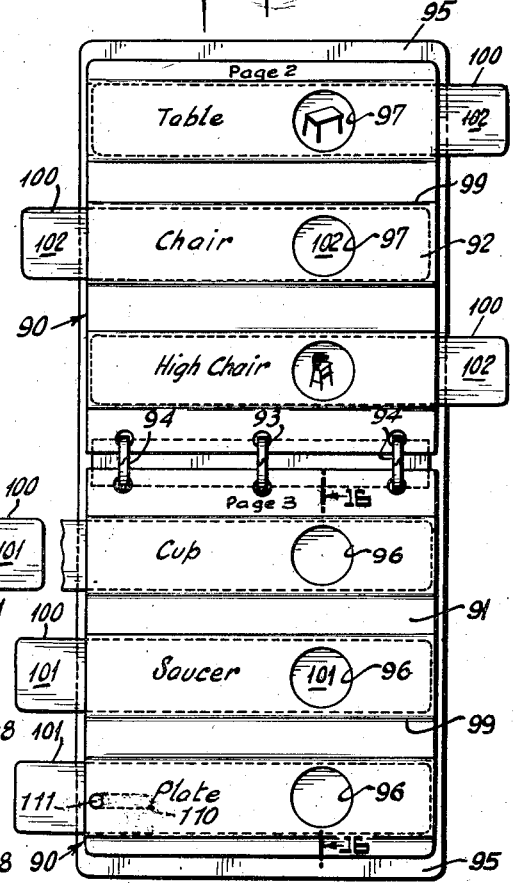
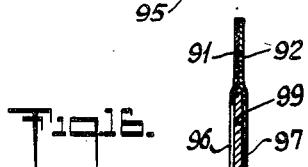
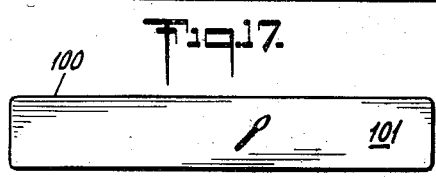
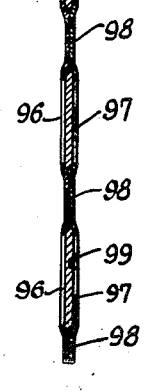
INVENTORS.
FRANK M. MINNINGER.
EVELYN S. MINNINGER.
BY
Samuel Stearman
ATTORNEY Patented Feb. 17, 1953

2,628,435

UNITED STATES PATENT OFFICE 2,628,435

EDUCATIONAL DEVICE

Frank M. Minninger and Evelyn S. Minninger, Rochester, Mich.

Application August 13, 1949, Serial No. 110,068

9 Claims. (Cl. 35—35)

This invention relates to an educational device designed primarily as a visual aid for assisting young children to learn the art of reading and doing simple arithmetic by sight.

A principal object of the invention is to provide an educational device which will afford to children of both pre-school and school age an enjoyable, self-help method for acquiring a substantial vocabulary of useful words and an ability to recognize such words on sight, and also for acquiring a substantial aptitude for doing simple arithmetic.

Another object of the invention is to provide a device which will be useful as a valuable means of remedial reading for children who require more exposure to words than do average pupils.

Still another object of the invention is to provide an educational device of this character, the operation of which will enable the young child to use his hands as well as his mind.

Briefly, according to the invention, there is provided an appliance, in the form of a book, folder or the like, each of the leaves of which has imprinted or otherwise displayed on each face thereof a desired number of words or other matter, the recognition of which is to be learned by the child, each such word or other matter being associated with a pictorial representation hereof, or with other appropriate instructional material, arranged to be selectively revealed or concealed from view.

More specifically, each leaf comprises two layers of thin, flexible, sheet material, each of the layers having the desired words or other matter displayed on the outer face thereof, and an opening formed therein in alignment with each of the words or items of other matter displayed on such outer face. Movable members are arranged between the adjacent inner faces of the two layers so that each of said members may be selectively moved from a position in which there will be revealed, through an opening in one of said layers, a pictorial representation of, or other instructional material related to, the word or other item with which the opening is aligned, to a position in which such representation or instructional material is concealed from view, means being provided for retaining each of the members in the interfacial space between the two layers and for guiding each of them in its movement between such positions.

The invention, its objects and advantages, will be more readily apparent from the following detailed description of several embodiments and from the accompanying drawings, in which:

Fig. 1 is a view, in perspective, of a book constructed according to one embodiment of the invention and shown with its cover open;

Fig. 2 is a plan view of the book shown in Fig. 1, opened to reveal adjoining leaves thereof, certain portions being broken away;

Fig. 3 is a fragmentary view of a portion of one of the leaves shown in Fig. 2;

Fig. 4 is a cross-sectional view taken along line 4—4 of Fig. 2;

Fig. 5 is an enlarged fragmentary view of Fig. 4;

Fig. 6 is a cross-sectional view taken along line 6—6 of Fig. 3;

Fig. 7 is a view, in perspective, showing another embodiment of the invention;

Fig. 8 is a plan view showing the embodiment of Fig. 7 unfolded;

Fig. 9 is a cross-sectional view taken along line 9—9 of Fig. 8;

Fig. 10 is a plan view showing still another embodiment of the invention;

Fig. 10a is a plan view showing the reverse face of the leaf appearing at the left-hand end of Fig. 10;

Fig. 11 is a cross-sectional view taken along line 11—11 of Fig. 10;

Fig. 12 is a plan view of a modified form of leaf that may be used with or in place of the leaves shown in Figs. 10 and 11;

Fig. 13 is a cross-sectional view taken along line 13—13 of Fig. 12;

Fig. 14 is a plan view of a book constructed according to still another embodiment of the invention and shown with its cover open;

Fig. 15 is a similar view thereof, opened at one of its pages;

Fig. 16 is a cross-sectional view taken along line 16—16 of Fig. 15;

Fig. 17 is a plan view of one of the parts of the book shown in Figs. 14–16; and Fig. 18 is a plan view of the reverse face of said part.

Referring now to Figs. 1 to 6, the embodiment of the invention there illustrated is in the form of a book, indicated generally by the numeral 10, and comprising cover members 11 and any desired number of leaves 12 enclosed between the cover members. Each of the leaves of the book is in the form of two facially adjacent layers or sheets of material 14, 15 such as heavy paper or cardboard, secured to one another in any suitable fashion along the horizontal and vertical edges thereof, as by adhesive tape indicated at 17. The several leaves of the book may be bound to one another and to the cover members 11 in any convenient fashion. In the embodiment illustrated, this takes the form of a spiral wire 22, the convolutions of which are received in perforations 23 formed along marginal edges 19 of each of the leaves, in well-known manner.

Each of the layers 14, 15 has imprinted or otherwise displayed on the outer face thereof a series of vertically spaced words, the sight reading of which is to be taught to the child user of the book.

In alignment with, and preferably adjacent the right-hand side of each of the words thus displayed on the layer 14, there is formed an opening 26. Likewise, the layer 15 is formed with an opening 29 in alignment with, and on the right hand side of, each of the words displayed on the outer face thereof, each of the openings 29 being in alignment with one of the openings 26. It will be noted, therefore, that the openings 26 are located in a vertical series adjacent one margin of each leaf, whereas the openings 29 are located in a vertical series adjacent the opposite margin thereof.

Each of the openings 26, 29 is associated with means whereby selectively to reveal or conceal thereat a pictorial illustration of the word adjacent each of such openings. To that end, movable members in the form of slides 30, made of paper, cardboard or the like are positioned intermediate the layers 14, 15 composing each leaf 12. These slides 30 are of a length less than the width of the layers by an amount substantially corresponding to the width of one of the openings 26, 29 so that each slide may be moved either to a position in which a pictorial representation of the word aligned with each of the openings in revealed through such openings, or to a position in which such pictorial representation becomes concealed. The slides 30 may be retained in a position for sliding movement between the two layers 14, 15 and to be guided in such movement in a variety of ways. As illustrated, this may take the form of suitable finger grips 33 connected to the slides 30 adjacent one end thereof and extending outwardly through horizontally elongated slots 35 formed in the layer 15 adjacent the lower end of the openings 29 therein. Similar finger grips 36 are connected adjacent the opposite end of each of the slides 30 and extend outwardly through openings 37 formed in the layer 14 adjacent the lower end of the openings 26 therein. Thus, each of the slides may readily be manipulated for movement selectively from the outer face of either of the layers 14, 15 i. e. whichever of these faces is presented to view, for selectively revealing or concealing at the openings formed therein the pictorial illustration of the words displayed thereon.

In the embodiment of Figs. 1-6, the pictorial representations or illustrations of the words displayed on the outer face of each layer 14 are displayed on the inner face of the facially adjacent layer 15 is registry with the openings 26 in the layer 14, while those of the words on each layer 15 are displayed on the inner face of said layer 14 in registry with the openings 29 in said layer 15.

Referring now more specifically to Fig. 2, the uppermost slide 30 of the leaf at the right hand side of this figure is shown positioned at the limit of its movement to the right. In that position, this slide conceals the picture of a boat applied to the inner face of layer 15 is registry with the uppermost opening 26 in layer 14 in alignment with the word "boat" displayed on the outer face of the layer 14. The slide 30 next therebelow is shown in a position at the limit of its movement to the left, thus revealing the picture of a train appearing on the inner face of layer 15 is registry with the opening 26 in layer 14 in alignment with the word "train" displayed on the outer face of the layer 14. The next lower slide is also shown in the same relative position, i. e., to reveal a pictorial illustration of a bus through the opening 26 of layer 14 in alignment with the word "bus." The next lowermost slide, associated with the word "eye," is shown in the same relative position as the two last described, while the lowermost slide, associated with the word "hat," is shown in the same relative position as the uppermost slide 30.

It will be seen that when any one of the slides is in a position in which it conceals, at an opening 26, the pictorial illustration of a word on the outer face of the layer 14 of each leaf, it will, in that position, reveal, at the horizontally aligned opening 29 in the facially adjacent layer 15 of the same leaf, the pictorial illustration of the aligned word on the outer face of such facially adjacent layer 15. Thus, the pictorial illustration of any one of the words on each of the leaves 12 may be individually revealed or concealed by movement of one of the slides 30 in the proper direction (to the left for revealing, and to the right for concealing, such illustration).

By means of this arrangement, a young child may readily be taught to recognize the words appearing on the outer face of each leaf of the book through mental association of the formation of each of these words with the corresponding picture or illustration. The child's knowledge of any of the words will be apparent when the child is able to recognize the word when the slide 30 is in the position in which the picture or illustration thereof is concealed.

Although for the purpose of illustrating and describing the invention, five words are shown displayed on each of the layers 14, 15, this number may be varied depending upon the surface dimensions of the layers forming each leaf of the book, the size of the lettering and the desired size of the accompanying pictorial illustrations of the words. As will be further evident, the book may be composed of any desired number of leaves to afford a vocabulary of useful size. The words, of course, may be selected from such scientifically graded lists as the Gates word list, the Rinsland list or that of Thorndike-Lorge.

In order to make sure that a child using the book actually recognizes a word when the corresponding picture is concealed by appropriate movement of one of the slides 30 to the picture concealing position, and that the child has not merely memorized the words in the order in which they appear on each of the pages, means may be provided for selectively blocking off or concealing one or more of the words themselves, thereby to alter the sequence in which the words on any of the pages may be visible. One such means, as best illustrated in Figs. 1 and 2, may comprise spaced flaps 40, made of stiff paper or the like, of a length to extend across the width of the page and perforated adjacent the inner ends thereof so as to be mounted on the spiral wire 22 for swinging movement. Thus, each flap 40 may be swung so as to cover either a word on the outer face of the layer 14 of one leaf of the book, or a word in alignment therewith on the outer face 15 of the adjoining leaf of the book (except in the case of the flaps 40 associated with the first and last pages of the book, which would serve only for concealing words on those pages which face the inside of the covers). As will be apparent, these flaps 40, being interposed between adjoining leaves of the book, will also serve to conceal the words displayed on one page, so that these latter will not divert the child's attention while concentrating on the words of the opposite page.

Another embodiment of the invention is illustrated in Figs. 7 to 9 inclusive. Here there is shown an embodiment of the invention in the form of a folder consisting of two leaves 50, 51. It will be understood that any desired number of such folders may be assembled in any convenient fashion in the form of a book, of loose-leaf form or otherwise. Each of these folders, in the form shown, consists of a single piece of relatively stiff paper or cardboard creased or scored to form a hinge line at 52 and folded along lines 53, 54 parallel to the hinge line 52 so that each of the leaves 50, 51 is composed of two facially adjacent layers 55, 56 the layers 56 being provided with extensions or flaps 58 along the upper and lower edges thereof, these flaps being folded over on to the outer face of layers 55 and adhesively secured thereto. A series of vertically spaced words may be imprinted or otherwise displayed on the outer surface of each of the layers 55, 56, preferably along the left-hand margin thereof. Adjacent and preferably to the right of each of the words on layers 55 and in alignment therewith, each of the layers 55 is formed with an opening 61. Likewise, each of the layers 56 is formed with an opening 62 adjacent and preferably to the right of each of the words displayed thereon, each of these openings being in alignment with one of said words. The openings 61 in each of the layers 55 are in horizontal alignment with the openings 62 in the companion layer 56. Movable members in the form of slides 64 are interposed between each layer 55 and its companion layer 56 for movement back and forth across each pair of openings 61, 62. In this embodiment, the pictorial representations of each of the words displayed are carried by the slides 64 themselves, instead of on the inner faces of the layers constituting the leaves, as in the case of the embodiment first described. Accordingly, the slides 64 are of a length equal at least to the distance between the outer ends of the openings 61 and the outer ends of the openings 62 of each leaf. In other words, in this embodiment, each of the slides 64 at all times underlies an opening 61 in one of the layers 55 as well as the horizontal aligned opening 62 in the facially adjacent layer 56, whether the slide is in position to reveal the pictorial illustrations at such openings or in position to conceal the same. Preferably, the outer ends of each of the slides 64 extend beyond the corresponding outer ends of the openings 61, 62. Studs or finger grips 65 are connected at one end of each of the slides 64 and extend through elongated slots 66 formed in the layer 55. These slots 66 preferably intersect the openings 61 at the laterally outer edge thereof.

Similarly, studs 67 are connected to the opposite ends of each of the slides 64, these studs extending through slots 68 formed in the layer 56, in alignment with the slots 66 and preferably also intersecting the openings 62 at the laterally outer edge thereof. The slides 64 are each provided on the surface thereof presented to view through the openings 61, with a pictorial illustration of one of the words displayed on the outer face of the layer 55, these pictorial illustrations being located on such faces in such position as to be revealed through the respective opening 61 when the slide is moved to a position at the limit of its movement toward the right, and to be concealed from view under the layer 55 when the slide is moved to the position at the limit of its movement to the left. Similarly, the opposite face of each of the slides 64 is provided with a pictorial illustration of one of the words displayed on the outer face of the layer 56, each of these illustrations also being located on the slide in such a position as to be revealed through the respective opening 62 when the slide is moved to position at the extreme right of the layer 56 (when presented to view) and to be concealed under layer 56 when the slide is moved in the opposite direction to the extreme limit of its movement to the left.

Figs. 10 to 13 illustrate embodiments of the invention which may be utilized for assisting young children to acquire an aptitude for doing simple arithmetic by sight. As shown in Fig. 10, these embodiments may be in the form of a folder consisting of any desired number of leaves 70 connected to one another as by spiral wire passing through perforations in the edges of the adjoining leaves, so as to form either a book with the leaves thereof arranged in the manner depicted in Figs. 1 to 6 or a folder arranged in accordion-pleated fashion.

Referring to Figs. 10 and 11, each of the leaves 70 consists of two spaced layers of material 71, 72 made of cardboard or the like, the respective layers 71, 72 being secured to one another along the marginal edges thereof. The outer face of each of the two layers may have imprinted thereon problems in simple arithmetic, the answers to which it is desired that the child learn. In this embodiment of the invention, the movable members are arranged to cooperate with openings formed in the layers 71, 72 so as selectively to reveal the answers to each of such problems, or to conceal the same. Since the numbers that would normally be used in teaching simple arithmetic to a young child would be of one or perhaps two digits occupying relatively small surface area, it is possible in this instance to utilize each of the layers 71, 72 to present several series of arithmetic problems for instruction of the child. Thus, as shown in Fig. 10, wherein problems in multiplication are illustrated, one series of such problems, vertically spaced from one another as indicated at 73, appear adjacent the left-hand side of each layer 72, and a second series of different problems, similarly spaced from one another but offset or staggered vertically with respect to those of series 73, appears at the right hand side of each layer 72, as indicated at 74. Likewise, on the reverse side of each leaf, namely on the outer face of each layer 71, one series of problems 73a is at the left-hand side of that face (as presented to view) and a second series, 74a, staggered or offset with respect to the first-named series, appears adjacent the right hand side thereof. Thus, each problem of series 73 is in horizontal alignment with one of the problems of series 73a on the opposite face of the leaf, and likewise, each problem of series 74 is in horizontal alignment with one of the problems of series 74a on such opposite face.

In each instance, the multiplier and multiplicand, as well as the usual cross mark symbolizing multiplication and a line immediately below the multiplier, are imprinted in the arrangement in which they would normally be written.

Each layer 71 is provided with an opening 75 immediately below each problem appearing thereon, and similarly, each layer 72 is provided with an opening 76 immediately below each of the problems appearing thereon. The answer to each of the respective problems, i. e., the product of each multiplicand and multiplier, appearing on the outer face of layer 72 is imprinted on the inner face of layer 71 in a position to be within the confines of the respective openings 76 in layer 72. Conversely, the answers to the respective problems appearing on the outer face of layer 71 are imprinted on the inner face of layer 72 in position to be within the confines of the respective openings 75 in layer 71.

Movable members, in the form of slides 77, are positioned intermediate the layers 71, 72 composing each leaf 70. Each layer 72 is formed with a horizontally elongated slot 78 adjacent the right-hand side of each opening 76 which is below a problem of series 73, and with a similar slot 78a adjacent the left side of each opening 76 which is below a problem of series 74. Similarly, each layer 71 is formed with similar slots 79, 79a respectively, adjacent the right hand and left hand sides of the openings 75 which are below the problems of series 73a, 74a appearing on layer 71. Suitable studs or finger grips 80, 81 are formed on or connected to each alternate slide 77 at horizontally spaced points to be received in slots 78, 79, respectively, and similarly spaced studs or finger grips 80a, 81a, are formed with or connected to each intervening slide 77 to be received in slots 78a, 79a, respectively. As will now be seen, each of the slides 77 of each leaf 70 may be manipulated from either face of the leaf for selectively revealing or concealing the answer to one of the problems appearing on each face of the leaf. Thus, when a slide associated with any of the problems of series 73 is moved to the limit of its movement to the right (i. e., when stud 80 is at the right-hand end of slot 78) the answer to such problem will be presented to view through the opening 76 immediately therebelow, while movement of this slide to the limit of its movement in the opposite direction (i. e., when stud 80 is at the left-hand end of slot 78) will conceal such answer from view. When this slide is similarly manipulated from the other face of the lead, it will likewise reveal the answer to one of the problems of series 73a, through the opening 75 immediately therebelow, when the slide is positioned with stud 81 at the right-hand end of slot 79 (i. e., in the same position as when stud 80 is at the left-hand end of slot 78) or will conceal such answer when positioned with stud 81 at the left-hand end of slot 79 (i. e., in the same position as when stud 80 is at the right-hand end of slot 78). The answer to the problems of series 74, 74a may likewise be selectively revealed by movement of the respective slides associated therewith toward the left until studs 80a or 81a, as the case may be, are at the left-hand end of the respective slots 78a, 79a, or concealed by positioning the slides with the studs 80a or 81a at the right-hand end of the respective slots 78a, 79a.

As will be evident, the foregoing construction may be utilized to assist a child in learning addition and subtraction by suitably imprinting a series of problems therein on the outer face of the layers 71, 72, in place of the series of multiplication problems shown at 73, 73a, 74, 74a, and printing on the inner face of layer 71, in registry with the openings 76 of layer 72, the answers to the respective problems presented on layer 72; and likewise printing on the inner face of layer 72 the answers to the respective problems appearing on layer 71, in registry with the appropriate openings 75 of layer 71.

Figs. 12 and 13 illustrate a single leaf (any number of which can be assembled into book form) constructed in generally the same manner as the leaves 70 of Figs. 10, 11, but modified to adapt it for assisting a young child to learn short division. For this purpose, typical problems in short division may be imprinted on the outer face of each of the layers 82, 83 in two series, one at one side of the layer and one at the opposite side thereof much the same as the arrangement of multiplication problems shown in Fig. 10. In this instance, however, the openings 84 are formed in each of the layers immediately above each problem i. e. in the relative place in which the quotient would normally be written. The quotients constituting the answers to the respective problems appearing on the outer face of one of the layers are imprinted on the inner face of the other layer in registry with the respective openings in the first-named layer, so as to be selectively revealed or concealed therethrough by movement of the slides 85 in one direction or the other. This embodiment also differs from that of Figs. 10, 11 in that the studs, indicated at 86 are connected to the slides in position to be received by elongated slots 87 formed in each of the layers immediately above the openings 84.

In Figs. 14 to 18 is shown an embodiment of the invention in the form of a book whose construction differs in several respects from that of the embodiments previously described. While also a loose-leaf form of book, the leaves 90 in this embodiment are arranged to hinge along one of the horizontal edges thereof, instead of along a vertical edge as in the other embodiments. Each leaf comprises two facially adjacent layers 91, 92, perforated as at 93 along one of the adjacent horizontal edges thereof to receive rings 94 for holding the same in loose-leaf fashion. If desired, these leaves may be enclosed within covers 95. Imprinted on the outer face of layer 91 of each leaf, preferably toward the left-hand side thereof, is a series of vertically spaced words. In alignment with and preferably to the right of each of these words, layer 91 is formed with an opening 96 of desired size and shape. The other layer 92 of each leaf likewise has a series of vertically spaced words imprinted on the outer face thereof, these words likewise being arranged at the left-hand side of layer 92 when the latter is presented to view on reversal of the leaf about the rings 94, each word on layer 92 being preferably imprinted along generally the same line with one of the words on layer 91. In alignment with and to the right of each of the words appearing on layer 92, the latter is formed with an opening 97 of desired size and shape, preferably the same as in the case of openings 96. Preferably, also, the openings 97 are in vertical alignment with the openings 96. The layers 91, 92 are secured to one another as by stitching or adhesive 98 extending transversely thereof in the space between each of the imprinted words and their respective horizontally aligned openings 96, 97.

It will be seen, therefore, that in this embodiment, each leaf 90 formed by one of the layers 91 and one of the layers 92 is provided with a series of pockets 99 extending transversely thereof, there being one such pocket for each word imprinted on layer 91 and the aligned word imprinted on the layer 92. Each pocket 99 is adapted to receive for easily sliding movement therein a member 100, the latter being of a length somewhat greater than the transverse dimension of the leaves. One face 101 of each member 100 carries a pictorial representation of one of the words appearing on one of the layers 91, in position to be presented to view through the opening 96 aligned with such word when the member is moved in its pocket a considerable distance to the right, and to be concealed from view by overlying portions of the material of layer 91 when the member is moved substantially the same distance in the opposite direction. The opposite face 102 of each member 100 carries a pictorial representation of the word appearing on layer 92 which is vertically aligned with the word on layer 91 of the same leaf, and whose pictorial representation is carried on the first named face of the member 100, the pictorial representation of the word appearing on layer 92 likewise being located on said opposite face of the member 100 in position to be presented to view at the opening 97 aligned with such word when the member is moved in its pocket 99 a sufficient distance toward the right, and to be concealed from view by the overlying portions of layer 92 when the member is moved a sufficient distance in the opposite direction. It will be understood, of course, that the pictorial representations on face 102 will be in upside-down relation to that on face 101 so as to appear right-side up when the leaf is reversed about rings 94.

As will be observed from Figs. 14 and 15, when any of the members 100 is in the position to reveal the pictorial representation of a word on layer 91 or 92, it extends laterally outward of the right-hand end of the pocket in which the member is carried; whereas, when in position to conceal such pictorial representation, it extends laterally outward of the left-hand end of said pocket. Thus, either projecting end of the members 100 may be utilized to effect sliding movement thereof in the pockets 99, whereby selectively to reveal or conceal the pictorial representations of the words appearing on the layers 91, 92. It will be understood, of course, that the slides 100 may be provided with suitable means to prevent them from being completely removed from their respective pockets 99. Thus, for example, as shown in Fig. 15, each of the slides may be formed with a horizontal slot 110 of a length corresponding substantially to its distance of movement from the picture revealing to the picture concealing position, and rivets or eyelets 111 may be secured to each of the layers 91, 92 in position to be received in the slot 110 and to serve as stops for limiting the outward movement of the slides in either direction.

We claim:

1. An educational device of the character described, comprising two facially adjacent layers of sheet material, each of said layers having a series of spaced indicia displayed on the outer face thereof, one of said layers having an opening formed therein adjacent each of said indicia appearing thereon, the other of said layers having an opening formed therein adjacent each of said indicia appearing thereon, a plurality of slidable members positioned intermediate the two layers for slidable movement therebetween, visual representations positioned to be visible through each opening upon predetermined movement of said slidable members, said representations corresponding to the indicia adjacent the respective openings, each of said movable members being positioned to underlie an opening in said layers and being selectively movable for selectively exposing and concealing independently of the other members at one of said openings in either of said layers one of said visual representations corresponding to the adjacent indicia.

2. An educational device of the character described, comprising two facially adjacent layers of sheet material, each of said layers having a series of spaced indicia displayed on the outer face thereof, one of said layers having an opening formed therein adjacent each indicia appearing thereon, the other of said layers having an opening formed therein adjacent each indicia appearing thereon and in lateral alignment with one of the openings in the first named layer, a plurality of slidable members positioned intermediate the two layers for slidable movement therebetween, visual representations positioned to be visible through each opening upon predetermined movement of said slidable members, said representations corresponding to the indicia adjacent the respective openings, each of said members being positioned to underlie an opening in said layers and being selectively movable to selectively expose and conceal independently of the other members at one of said openings in one of said layers and alternately at the aligned opening in the other of said layers one of said visual representations corresponding to the adjacent indicia.

3. An educational device of the character described, comprising two facially adjacent layers of sheet material, each of said layers having a series of spaced indicia displayed on the outer face thereof, one of said layers having an opening formed therein adjacent each of said indicia appearing thereon, the other of said layers having an opening formed therein adjacent each of said indicia appearing thereon and in alignment with one of the openings in the first-named layer, a plurality of slidable members positioned intermediate the two layers, said members each being of a length less than the dimension of said layers measured linearly of its sliding movement and being positioned to underlie an opening in said layers, visual representations positioned to be visible through each opening upon predetermined movement of said slidable members, said representations corresponding to the indicia adjacent the respective openings, and means formed with each of said members for effecting movement thereof of each of them selectively from the outer face of either of said layers for selectively exposing and concealing independently of the other members at one of the openings in one of said layers and alternately at the aligned opening in the other of said layers a visual representation corresponding to the adjacent indicia.

4. An educational device of the character described, comprising two facially adjacent layers of sheet material, each of said layers having a series of spaced indicia displayed on the outer face thereof, one of said layers having an opening formed therein adjacent each of said indicia appearing thereon, the other of said layers having an opening formed therein adjacent each of said indicia appearing thereon and in lateral alignment with one of the openings in the first-named layer, and a relatively narrow slidable member positioned intermediate the two layers in alignment with each of the openings in one of said layers and the aligned opening in the other of said layers, each of said members being selectively slidable in one direction to a position for revealing independently of the other members through the aligned opening in either of said layers an area of the inner face of the other of said layers and alternately in the opposite direction to a position for concealing said area, each of said areas bearing a visual representation corresponding to the adjacent indicia on the outer face of the other layer.

5. An educational device of the character described, comprising two facially adjacent layers of sheet material, each of said layers having a series of spaced indicia displayed on the outer face thereof, one of said layers having an opening formed therein adjacent each of said indicia appearing thereon, the other of said layers having an opening formed therein adjacent each of said indicia appearing thereon and in alignment with one of the openings in the first-named layer, and a plurality of slidable members positioned intermediate the two layers, said members being positioned to underlie an opening in said layers and being selectively movable, each of said members carrying on one face thereof a visual representation corresponding to one of said indicia adjacent one of the openings in one of said layers and carrying on the other face thereof a visual representation corresponding to the indicia adjacent the aligned opening in the other of said layers, said representations being positioned on each of said members so as to be selectively revealed independently of the other members through said respective openings and alternately to be concealed from view thereat.

6. An educational device of the character described, comprising two facially adjacent layers of sheet material, each of said layers having a series of spaced indicia displayed on the outer face thereof, one of said layers having an opening formed therein adjacent each said indicia appearing thereon, the other of said layers having an opening formed therein adjacent each indicia appearing thereon, a plurality of movable members positioned intermediate the two layers for movement therebetween, visual representations positioned to be visible through each opening upon predetermined movement of said slidable members, said representations corresponding to the indicia adjacent the respective openings, each of said movable members being positioned to underlie an opening in said layers and being selectively movable for selectively exposing and concealing independently of the other members at each of said openings one of said visual representations corresponding to the adjacent indicia, and finger grips connected at points spaced lengthwise of each of said members and extending through aligned slots in each of said layers for retaining said members in the interfacial space between said layers and guiding them in their movement therein.

7. An educational appliance having a plurality of leaves, each of said leaves being constructed of two facially adjacent layers of sheet material as defined in claim 1.

8. An educational appliance having a plurality of leaves, each of said leaves being constructed of two facially adjacent layers of sheet material as defined in claim 4.

9. An educational appliance having a plurality of leaves, each of said leaves being constructed of two facially adjacent layers of sheet material as defined in claim 5.

FRANK M. MINNINGER.
EVELYN S. MINNINGER.

REFERENCES CITED

The following references are of record in the file of this patent:

UNITED STATES PATENTS

| Number | Name | Date |
|---|---|---|
| 1,023,586 | Mullins | Apr. 16, 1912 |
| 1,120,681 | Browning | Dec. 15, 1914 |
| 1,286,157 | Vizcarra | Nov. 26, 1918 |
| 1,445,819 | Boyle | Feb. 20, 1923 |
| 1,538,530 | Troidl | May 19, 1925 |
| 2,213,411 | Rippon | Sept. 3, 1940 |
| 2,336,742 | Maguire | Dec. 14, 1943 |
| 2,361,154 | Schoolfield | Oct. 24, 1944 |
| 2,449,116 | Hatchett | Sept. 14, 1948 |
| 2,453,265 | Robinson | Nov. 9, 1948 |
| 2,477,134 | Mariner | July 26, 1949 |

FOREIGN PATENTS

| Number | Country | Date |
|---|---|---|
| 238,060 | Great Britain | Aug. 13, 1925 |